United States Patent [19]

Bellavoine

[11] 4,225,204
[45] Sep. 30, 1980

[54] CUPBOARD FOR STORING PREPARED MEALS, WITH COLD-STORAGE AND REHEATING BY MICROWAVES

[75] Inventor: Robert Bellavoine, Plombieres-les-Bains, France

[73] Assignee: De Pruines Iseco, Plombieres-les-Bains, France

[21] Appl. No.: 608

[22] Filed: Jan. 2, 1979

[30] Foreign Application Priority Data

Jan. 10, 1978 [FR] France .............................. 78 00517

[51] Int. Cl.² .................... F25B 29/00; A47B 77/08
[52] U.S. Cl. ..................... 312/236; 165/58; 219/386
[58] Field of Search ................. 312/236; 165/48, 58; 219/10.55 R, 10.55 A, 10.55 F, 10.55 E, 385, 386

[56] References Cited

U.S. PATENT DOCUMENTS

| | | | |
|---|---|---|---|
| 2,453,703 | 11/1948 | De Carlo, Sr. ...................... | 312/236 |
| 2,583,338 | 1/1952 | Morse et al. .................. | 219/10.55 A |
| 3,205,033 | 9/1965 | Stentz ..................... | 312/236 |
| 3,440,385 | 4/1969 | Smith ........................... | 219/10.55 R |
| 3,854,024 | 12/1974 | Kaufman, Jr. et al. ...... | 219/10.55 A |
| 3,908,749 | 9/1975 | Williams ............................ | 219/386 |
| 4,019,022 | 4/1977 | Seider et al. ........................ | 165/48 |
| 4,068,115 | 1/1978 | Mack et al. ........................ | 312/236 |
| 4,103,736 | 8/1978 | Colato et al. ....................... | 312/236 |
| 4,125,151 | 11/1978 | Hays et al. ........................... | 165/58 |

*Primary Examiner*—Victor N. Sakran
*Attorney, Agent, or Firm*—Pollock, Vande Sande & Priddy

[57] ABSTRACT

The invention relates to a cupboard for storing and bringing prepared meals to a suitable temperature, said cupboard being divided into a storage compartment or space and a compartment or chamber for bringing to suitable temperature. The meals are carried on trays superposed in the storage space. Individual metallic flaps comprising at least one mobile portion are provided at the level of each tray in order to separate or place the storage space and chamber in communication and transporting mechanisms are provided for transferring the dishes contained in inner compartments of the trays towards the chamber for bringing to suitable temperature and for returning them into the compartments where they were located after a sequence of bringing to suitable temperature in the chamber intended for this purpose. The invention finds particular application in the distribution of meals in collective catering.

17 Claims, 19 Drawing Figures

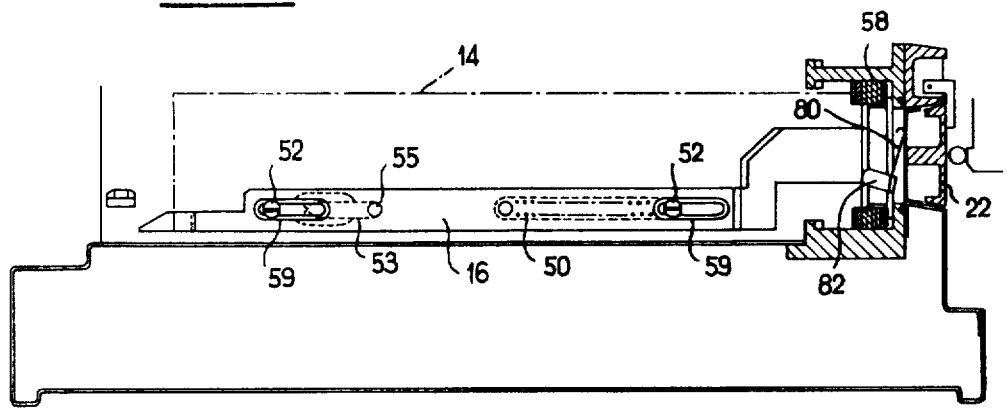
FIG_7
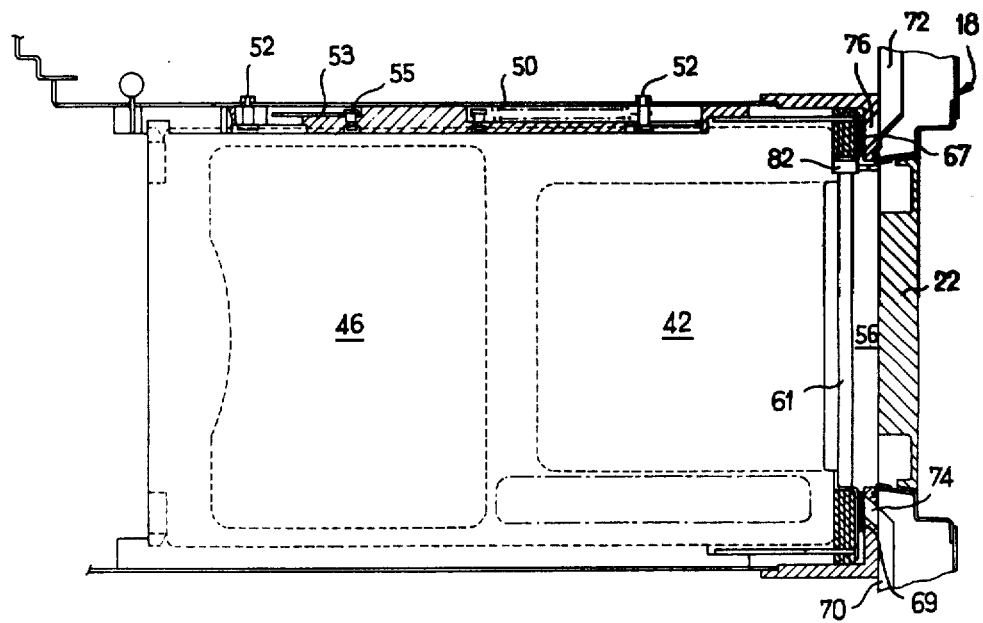
FIG_8

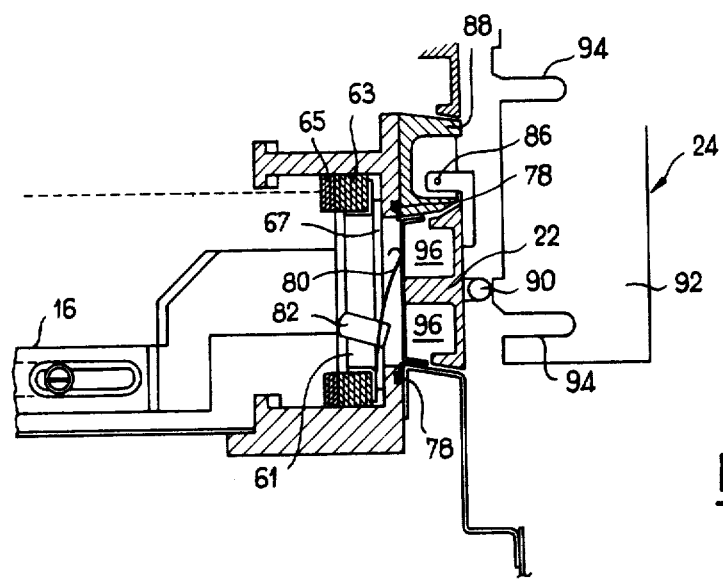
FIG_9
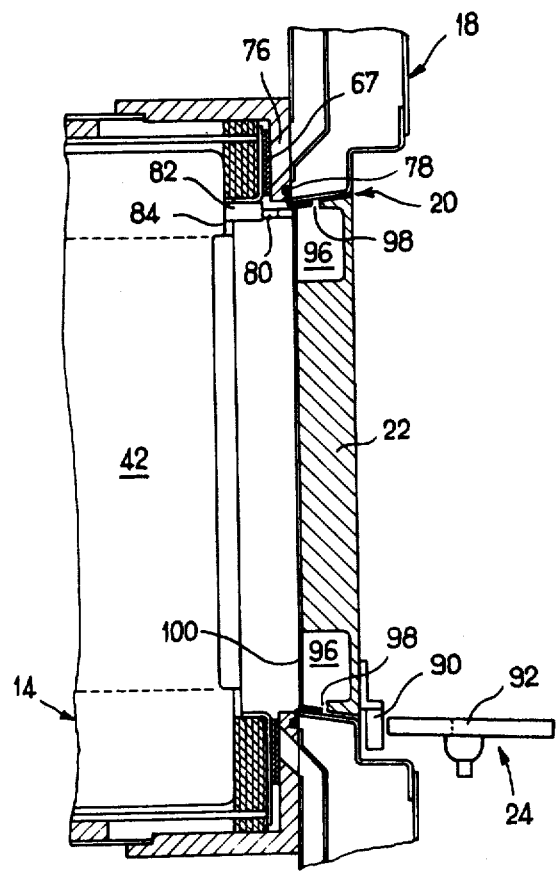
FIG_10

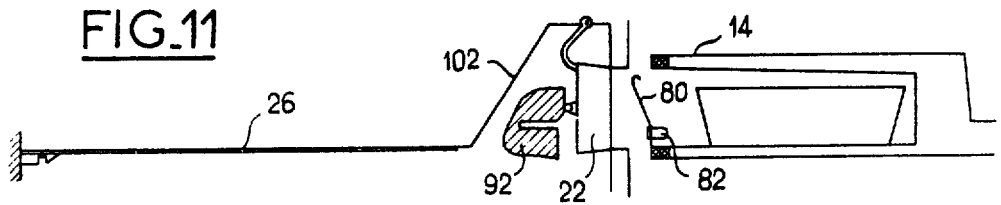
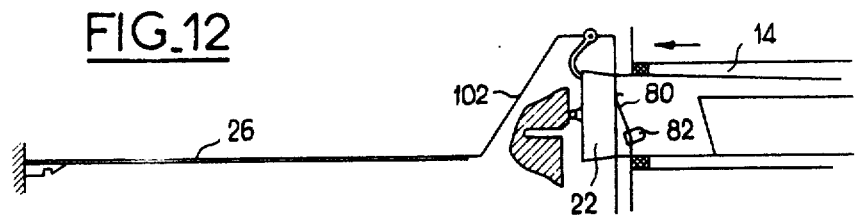
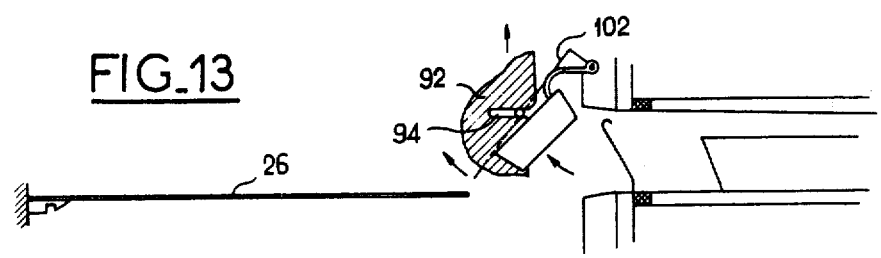
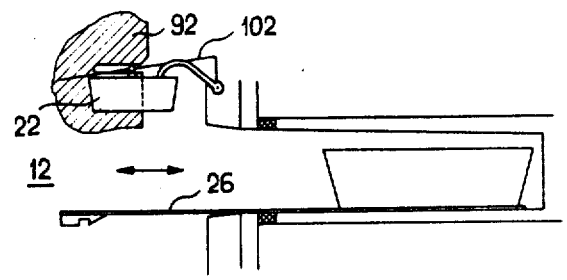
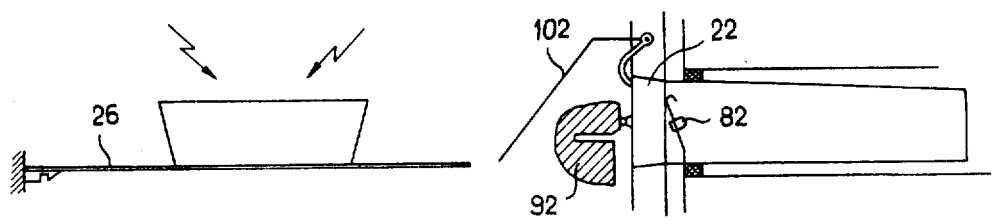

CUPBOARD FOR STORING PREPARED MEALS, WITH COLD-STORAGE AND REHEATING BY MICROWAVES

BACKGROUND OF THE INVENTION

The present invention relates to a cupboard for storing and taking to a suitable temperature prepared meals on individual trays with a view to distributing these meals some time after their preparation.

SUMMARY OF THE PRIOR ART

Such a storage cupboard may be used in all collective catering installations in which it is preferred to prepare the meals in advance rather than at the moment when they are to be consumed. This is particularly the case in hospitals, but many other cases may be envisaged, for example for catering in public transport (trains, planes, etc . . .)

A certain number of problems are raised when a large number of complete meals (hors d'oeuvre entrée, main dish, cheese, dessert, bread, drink, etc . . .) are to be prepared on the same tray, the meals differing from one tray to another as a function of the choice of the consumer or his diet, most of the contents of the tray having be kept cool at a temperature of about 7° to 10° C., the main dish being either in the form of a cold product to be eaten as such, or in the form of a chilled (+3° C.) or frozen (−18° C.) product to be consumed after having been reheated to a temperature of at least 65° C.

Each time a large number of meals are prepared with a view to being consumed at a meal time which is virtually the same for a certain number of consumers, the possible reheating of the chilled or frozen main dishes will have to be effected simultaneously for all the corresponding meal trays.

There is then the problem of the risk of mixing the dishes of the various trays after they have been heated if the dish to be heated is removed from the rest of its tray (which, itself, must not cease to be kept at a cool temperature of about 7° to 10° C.)

Another problem arises from the fact that it is sometimes necessary to take a group of trays to a suitable temperature with a view to immediate consumption, while other groups of trays stored in the same cupboard are to be heated later, with a view to later consumption.

SUMMARY OF THE INVENTION

It is an object of the present invention to solve these problems and to allow complete meals to be prepared on individual trays, by rendering possible the preparation of meals in which the main dish is either in the form of a cold product or in the form of a chilled or frozen product, likewise rendering possible the transport and storage of these trays without separating the elements thereof, particularly during the possible reheating of the main dish while the other products on the tray are maintained at a cool temperature of 7° to 10° C.

It is another purpose of the invention to provide that the trays are stored with maintenance of the temperature of the main dish at +3° or −18° C. if it is a chilled or frozen dish, and with maintenance of the temperature of all the other cold products at a cool temperature of 7° to 10° C.

Another purpose of the invention is to provide a cold-storage and reheating cupboard in which a certain number of trays may be stored which are to be heated at different times, without it being necessary to position the trays at determined spots or in a determined order corresponding to the time when they are to be subsequently heated.

It is yet another object of the invention to prevent a tray which has already been reheated to from undergoing a second heating in case the tray is not withdrawn from the cupboard after its first heating.

A further object of the invention is to assure that the main dish is kept hot after the reheating sequence, during the time when the trays remain stored in the cupboard before they are effectively distributed to the consumers.

On the other hand, as certain meals may comprise cold, but not chilled or frozen dishes, or may even not comprise a main dish at all, another object of the present invention is to prevent the corresponding tray from being subjected to the action of refrigeration during the period of storage of the tray or from being subjected to the action of heat during the period of reheating.

BRIEF DESCRIPTION OF THE DRAWINGS

FIG. 7 is a view similar to FIG. 5, the drawer being in its front position.

FIG. 8 is a view similar to FIG. 6, the drawer being in its front position.

FIG. 9 is an enlarged view of a lateral section of the front part of the drawer supporting a tray.

FIG. 10 shows a section, seen from above, corresponding to FIG. 9.

FIGS. 11 to 13 show the successive phases of lifting of the mobile flaps at the beginning of a heating sequence.

FIGS. 14 and 15 show the stages of transfer of a dish to be reheated into the microwave chamber.

DESCRIPTION OF THE PREFERRED EMBODIMENT

Figure 1:
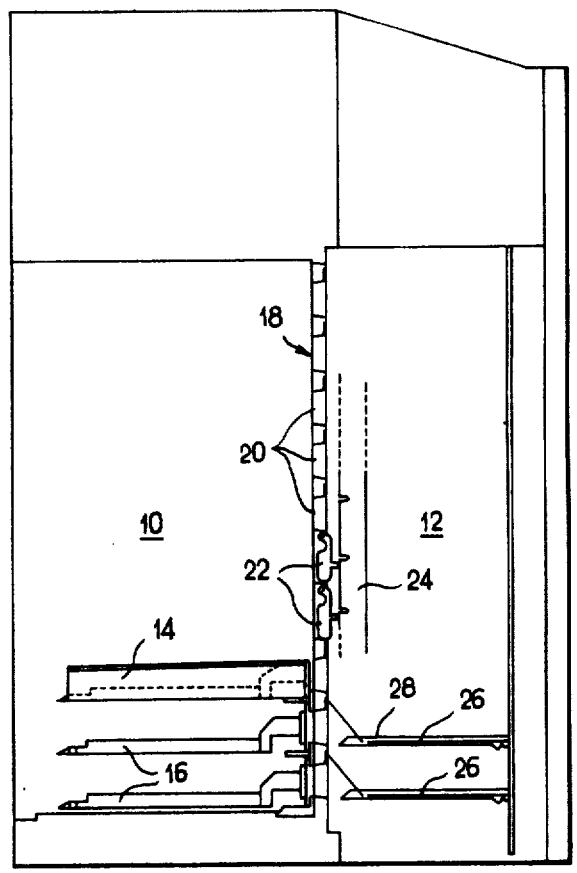
FIG. 1 is a side view of the interior of the cupboard according to the invention.

In FIG. 1, which very schematically shows a vertical section through the cold-storage and reheating cupboard according to the invention, the cupboard is essentially composed of two compartments, a compartment or space 10 for storage of the trays of prepared metals and a compartment or chamber 12 for reheating the dishes to be heated which are carried on the trays stored in the adjacent space 10.

The storage space is arranged to receive one or more series of meal trays 14 arranged on superposed runners 16. The trays may be introduced into the cupboard through a door (not shown) of the storage space. The trays are pushed on the runners 16 until they abut a separation wall 18 between the storage space and the reheating chamber.

The separation wall 18 is pierced by openings 20, regularly spaced out over the whole wall, so that an opening 20 is located at the level of each tray which may be introduced into the cupboard. Each opening 20 is provided with a mobile closure flap 22 which may insulate or, on the contrary, place the storage space in communication with the reheating chamber at the level of each tray. The flaps 22 may be opened or closed by means of a control device 24 common to each series of vertically superposed flaps.

The reheating chamber 12 is preferably a microwave chamber, i.e., it comprises a source of electromagnetic microwave rays, capable, by radiation, of strongly heating the bodies which absorb these rays and which are placed in the microwave chamber on the path of these rays. All of this reheating chamber 12 is insulated from the outside and from the storage space by metal walls, including the flaps 22 which must remain closed during the whole sequence of reheating by microwave radiation, so that the radiation remains confined inside chamber 12.

The storage cupboard according to the invention comprises, in the reheating chamber, means for transferring through each opening 20 a dish to be reheated, carried by a tray 14 opposite this opening 20. These transfer means are constituted, as shown schematically in FIG. 1, by horizontal pallets 26 which may move in their plane on runners 28 opposite each opening 20 of the wall 18, so as to be able to penetrate from the reheating chamber towards the storage space when the corresponding flaps 22 are open. During this displacement, each pallet collects the dish to be reheated, which is carried by the tray 14 and, on withdrawing into chamber 12, each pallet takes the corresponding dish into this chamber with a view to proceeding with the reheating sequence. In the same way, once the sequence is terminated, the pallets 26 return the heated dishes onto the trays 14.

The transfer means as well as their functioning will be described in greater detail hereinafter. It can be seen that the prepared meals are stored and reheated without real separation of the different constituents of the tray, since each dish to be reheated remains permanently opposite the tray which carried it; there is no possible mixing or inversion of the dishes of the different trays.

To render FIG. 1, which is only a schematic view, more clear, some elements have been omitted. For example, only three runners 16 have been shown in the storage space 10, and only one runner carries a tray 14. Only two flaps 22 have been shown, and these moveover, have not been shown opposite runners 16 to facilitate the illustration, and only two transfer pallets 26 have been shown. It is obviously to be understood that the trays are superposed over the whole height of the storage space and possibly, as may be seen from FIG. 2, in several stacks placed side by side, and that consequently the openings 20, flaps 22 and pallets 26 likewise extend over the whole height of the reheating chamber, as an opening 20, a flap 22 and a transfer pallet 26 correspond to each tray position.

Figure 2:
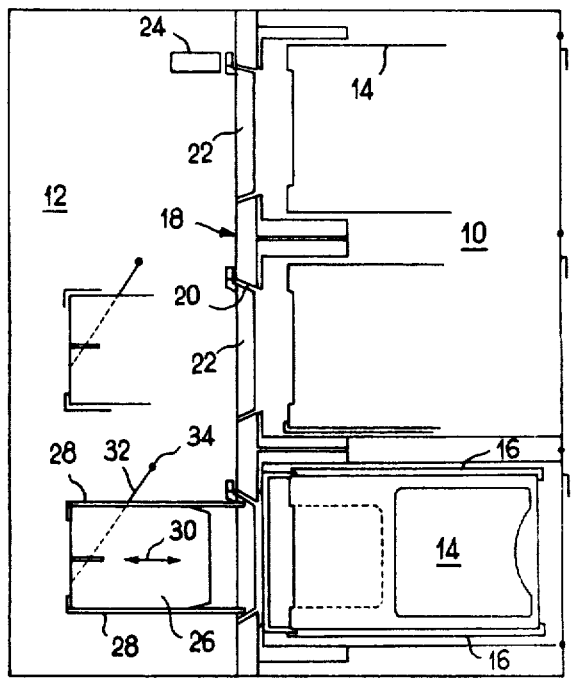
FIG. 2 is a plan view of the inside of the cupboard.

In the same way, FIG. 2 shows a simplified plan view of the interior of the cold-storage and reheating cupboard of FIG. 1. In this view, the storage space 10 is seen to comprise three stacks of superposed trays. Each tray is carried on runners 16 and is located opposite an opening 20 in the separating wall 18 between the two compartments. Opposite each tray position and in the microwave chamber 12 there is placed a pallet 26 for transporting the dish to be reheated. This pallet 26 may move in the direction of double arrow 30 due to the guide runners 28 which support it and due to a drive rod 32 which is moved in rotation by a drive shaft 34 common to a whole series of superposed pallets.

A system 24 for controlling the lifting and lowering of the flaps 22 is provided for each series of superposed flaps 22. One of them has been shown schematically in part of FIG. 2. It is placed laterally with respect to the series of flaps 22 and acts on rollers of these flaps to effect lifting, the rollers extending laterally with respect to the flaps 22.

The lateral position of the control systems 24 obviously is determined by the necessity of leaving free passage for all the pallets 26 towards the trays.

Figure 3:
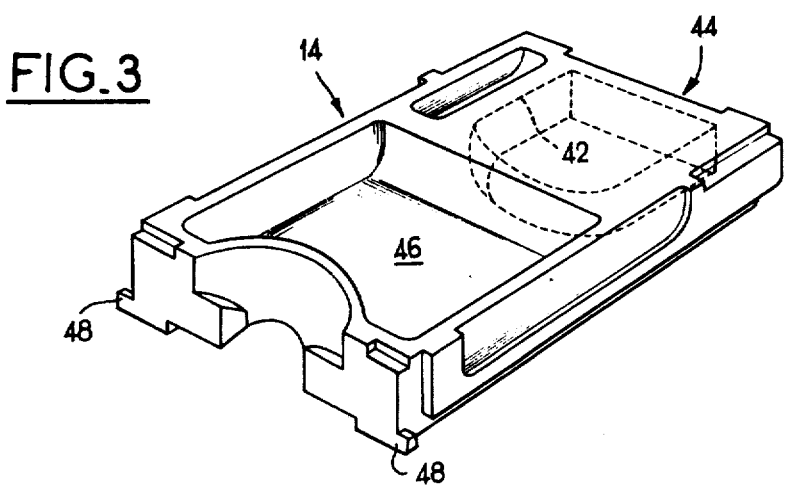
FIG. 3 is a perspective view of a tray adapted to be stored in the cupboard.

FIG. 3 shows in greater detail a tray which is particularly adapted to use in the cold-storage and reheating cupboard of FIG. 1. This tray has the particularity of having a closed inner compartment opening on a lateral wall at the front of the tray. This compartment is adapted to receive the main course of the meal carried by the tray, i.e., most often a dish to be reheated. The other ingredients of the meal which are cold products or products which do not require reheating are carried in conventional manner on the top of the tray. In FIG. 3, the tray is designated by 14, the lateral compartment by 42, the opening of this compartment by 44, and the space reserved for the ingredients other than the dish to be reheated, by 46; this space is at the rear of the tray if the direction of introduction of the tray into the cupboard is taken as reference.

The tray further comprises a feature which is a fastening lug 48 at its lower rear part, on each side thereof. This lug serves, as will be seen hereinafter, for fastening the tray on the runners 16 to make it fast therewith.

Figure 4:
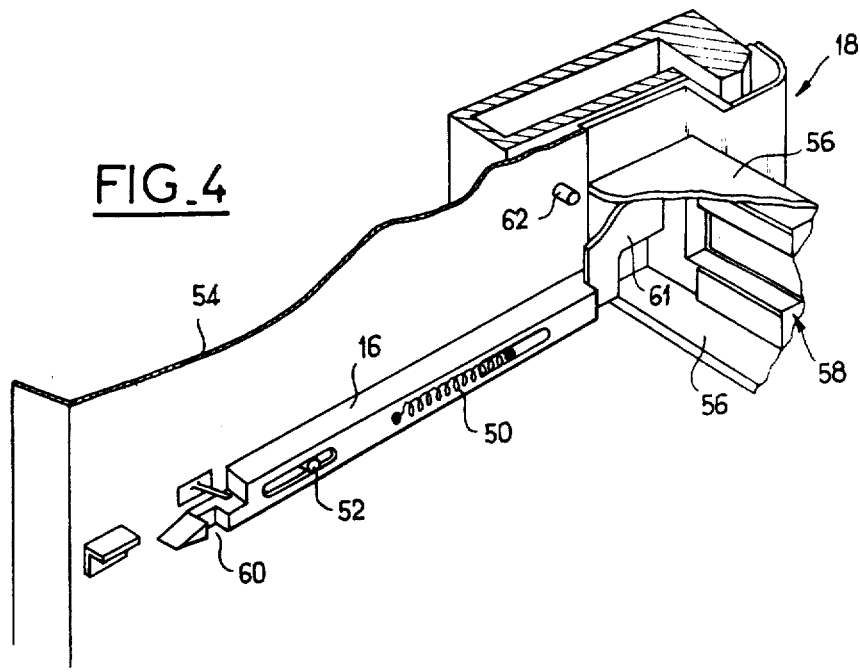
FIG. 4 is a perspective view of the mobile runners for supporting a tray in the cupboard.

FIG. 4 shows in perspective a view of a runner 16 serving to support the trays 14 inside the storage compartment. In fact, the runners are arranged in a special way, since they are mobile and may move longitudinally between a front position to which they are normally returned by a spring 50 and a rear position in which they may remain fastened due to a lug 52 fixed on a wall 54 supporting the runner and to a retaining attachment which will be seen more clearly in FIGS. 5 to 8. The two runners 16 carrying each tray 14 are symmetrical (only one is shown in FIG. 4); the are connected together by their front part so as to form a drawer capable of carrying a tray and of moving therewith once the tray is fitted on this drawer.

This arrangement of the runners 16 for supporting the trays arises from the necessity of providing the possibility of chilling or not chilling the dish contained in the inner compartment 42 of the trays.

With reference to FIGS. 1 and 2 describing the storage cupboard, no mention has yet been made, in order to simplify the description, of the chilling system which is provided to assure that the chilled or frozen products contained in compartment 42 of each tray are kept cold (at either 3° or −18° C.).

This system of refrigeration normally comprises shafts for the circulation of cold air in the vicinity of the wall 18 separating the compartments 10 and 12, so as to be able to present fluid inlet and evacuation openings at the level of the compartment 42 of each tray installed on runners 16. The front parts of the drawers formed by these runners constitute seals which obstruct the respective openings of the cold air circulation shafts when the drawers are returned into front position by springs 50. On the contrary, if the drawers are fastened in rear position, the cold air openings are unobstructed. The sealing system at the front of the drawer is such that each cold air may be directly solely into the compartment of a tray mounted on this drawer but not elsewhere, and particularly not in the microwave chamber since said latter is insulated by the closed mobile flaps 22, and not in the rest of the storage space due to a passage formed by an assembly of rectangular walls 56 in which is engaged the front part of the drawer as well as the front part of the tray carried by such drawer. The sealing system 58 forms a seal both with the walls of this passage and with the tray, whatever the position of the drawer, tightness being effected, moreover, with the openings of the cold air circulation shafts, when the drawer is in front position. The openings in question open out inside the corridor formed by the walls 56.

The sealing system 58 is formed by a rectangular band leaving at its centre a free space corresponding to the dimensions of the opening 44 of the inner compartment of the trays so that the sealing band does not obstruct this opening and allows free passage not only for the cold air but also for the dishes which must be transferred by the pallets 26 from inside the compartment towards the microwave chamber.

On the tray side, the sealing band must be closely adapted to this latter in order not to allow air to escape through the edges of the tray to outside the corridor 56. It is therefore necessary to provide a system of engagement of the tray on the runners 16 so that the tray remains closely applied against the sealing band of the drawer once it is positioned on this drawer. A hook 60 cooperates to this end with the rear lugs 48 of the trays 14. When these lugs are engaged in the hooks 60, the tray comes into close contact with the sealing band 58. Moreover, a supplementary purpose for these hooks is that they allow the tray-drawer assembly to be pulled, by acting only on the tray itself when its rear part is engaged in the hooks 60. This pull makes it possible to place the tray-drawer assembly in rear position, thus uncovering the openings for circulation of cold air, hitherto closed by the sealing system 58. On the contrary, in the absence of a tray, or if the tray is not engaged in the hooks 60, the withdrawal of the drawer into rear position is not possible and the openings of the cold air circulation shafts remain permanently obstructed by the drawer in front position.

This particular arrangement is used not only for eliminating any leakage of cold air towards the storage space but also for preventing a meal, the main dish of which in the form of a cold product, being subjected to the action of the aif of the cold air circulation shafts at +3 or −18° C. In fact, the trays which carry such cold dishes in their compartment 42 are prevented from engaging in the hooks 60.

By way of example, the following means are used for preventing this engagement: The trays are provided with a lid and a special lid is provided for the trays carrying a cold dish, this lid cooperating with a fixed stop 62 on the wall 54 to prevent the complete penetration of the tray in the drawer and in particular to prevent the hooking of the lugs 48 in the hooks 60.

The engagement of the tray not being possible, a pull of the tray to the rear is not transmitted towards the whole of the drawer, and said latter therefore remains in front position where the openings of the cold air circulation shafts remain obstructed by the seal system 58. Therefore no air leakage towards the storage space takes place.

FIGS. 5 to 10 show how the seal system 58 is divided into two parts, a front part serving precisely to obstruct the cold air inlet and evacuation openings and a rear part serving both as seal with the edges of the tray around the compartment 42 and with the walls of the rectangular passage 56 so as to confine the cold air inside the compartment 42 and inside the passage 56 when the drawer is in rear position, preventing any leakage towards the rest of the storage space.

Figure 5:
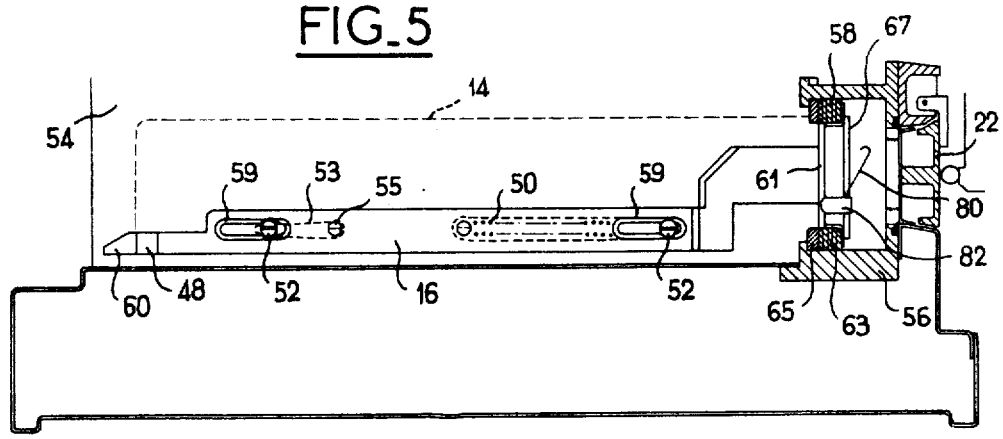
FIG. 5 shows a lateral section through the storage cupboard at the level of a tray, the drawer carrying a tray being in its rear position.
Figure 6:
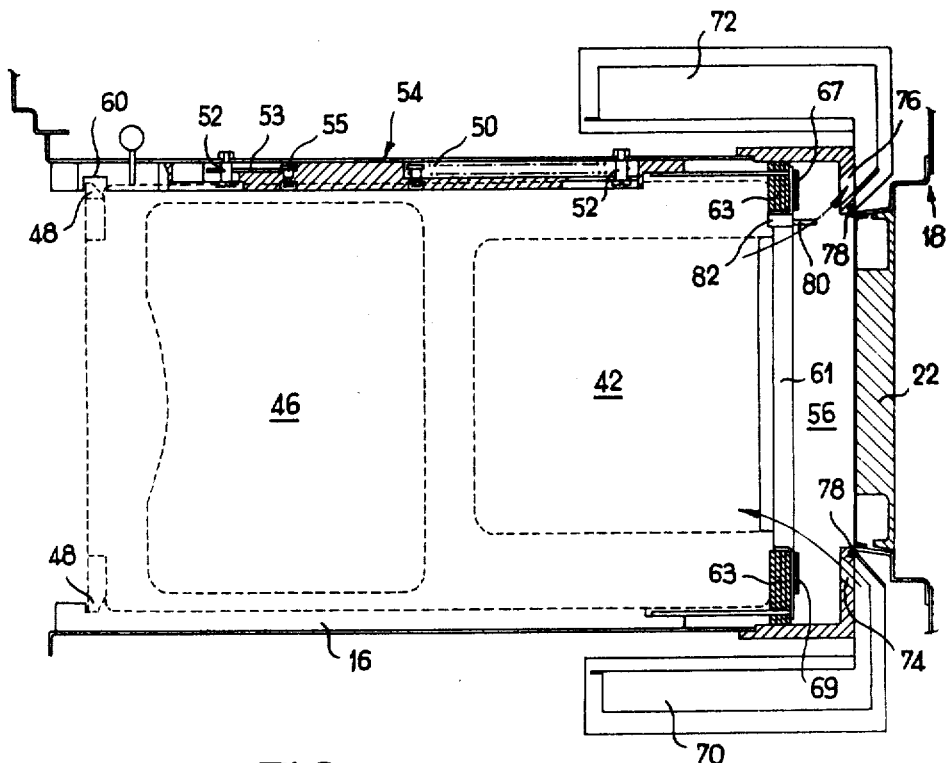
FIG. 6 is a plan view in section corresponding to FIG. 5.

FIGS. 5 and 6 respectively show in lateral section and in plan view a mobile drawer assembly supporting a tray, this drawer being placed in rear position, which is possible only if a tray (shown in broken lines) is completely engaged by its rear lugs 48 in the hooks 60 of the runners 16.

The runners 16 are retained in rear position, as already explained, by means of retaining attachments 53 cooperating with a lug 55 in the runner and a lug 52 fixed on the wall 54 supporting the runner 16. The longitudinal movement of the runner is made possible by guide grooves 59 which cooperate with at least two lugs such as 52 on the wall 54.

In rear position, the return spring 50 of the runner is stretched.

The two runners 16 corresponding to a given tray position are connected and made fast with each other by a front metallic part 61 cut out at the level of the opening of the compartment of a tray engaged on the runners to allow free passage towards the compartment of the tray. The front metal part carries the seal system 58 which comprises a rectangular seal 63 adapted closely inside the rectangular passage 56 and slidable inside this passage without leaving it both when the drawer is in front position and when it is in rear position. As has been explained, the part of the seal 63 facing the front part of the tray 14 must be adapted to this front part so as to form a seal all around the compartment 42 of the tray.

Consequently, as shown in the drawings, in the case of the tray 14 comprising a notch at its front part, a seal part 65 is provided, forming a projection with respect to the rest of the seal 63 to fill the notch the tray. The seals 63, 65 present a certain elasticity and are compressed by the tray when said latter is engaged in the runners by its rear lugs 48.

Right at its front part, the seal system 58 further comprises two other plates forming seals 67 and 69 which are adapted to obturate the openings of the cold air circulation shafts when the tray is in its advanced position (FIGS. 7 and 8).

For each stack of superposed trays, a cold air inlet shaft 70 and a cold air evacuation shaft 72 have been provided laterally, each extending from one side of the stack of superposed trays. The shaft 70 opens into the passage 56 through a cold air inlet opening 74 against which the seal part 69 may be applied. In the same way, the shaft 72 opens out through a cold air evacuation opening 76 against which the seal part 67 may be applied, to obstruct it.

In the rear position of the mobile drawer carrying the tray 14, the compartment 42 of the tray is located opposite an opening 20 in the wall 18 separating the storage space from the microwave chamber, and this opening 20 is closed by a metallic flap 22.

A seal 78 is provided on the periphery of the opening 20 to avoid any leakage of cold air between the passage 56 and the microwave chamber through the not completely contiguous metal edges of the flap 22 and the opening 20. The flap 22 is applied against the seal 78 when it is in closed position.

A perfectly tight enclosure is thus produced for keeping the dishes contained in the compartment 42 cold.

As has already been explained, if a cold dish is contained in the compartment 42, it is provided with a special lid preventing the tray from engaging on the drawer and consequently preventing the drawer from being withdrawn in rear position, as the only means of gripping the drawer is the edge of a tray engaged on this drawer. There is therefore no chilling of the cold products.

FIGS. 7 and 8 show a section and plan view similar to those of FIGS. 5 and 6, but here the drawers are shown in advanced position, the plates 67 and 69 obstructing the opening 76 and 74 of the cold air circulation shafts.

FIGS. 7 and 8 show a supplemetary piece carried by the front part 61 of the drawer, the purpose of this piece being to allow the opening of the flap 22 corresponding to this drawer solely when a tray is engaged on the drawer and when the drawer is in its front position.

This piece is constituted by a spring 80 which is mounted on the part 61 and a stop 82 fast with this spring and projecting on the side of the tray with respect to the part 61 so that the tray engaged the drawer may abut on the stop 82 and push the spring towards the rear of the housing 56, i.e. towards the flap 22.

The spring 80—stop 82 assembly is mounted laterally with respect to the compartment 42 of the trays mounted on the drawer.

In the absence of a tray on the drawer, the spring 80 is not pushed against the flap 22, whether the drawer is in front position or in rear position. In any case, whether or not a tray is engaged on the drawer, the spring 80 does not abut on the flap 22 if this drawer is i rear position. The only case of the spring 80 abutting the flap 22 is the case of the drawer being in front position and a tray being engaged correctly on this drawer, at the same time.

The whole of the front part of the drawer is more clearly visible in FIGS. 9 and 10 which show enlarged detailed views of FIGS. 7 and 8, respectively.

In particular, it is seen how the front part 84 of one side of the tray abuts the stop 82 to push the spring 80 against the flap 22.

In the absence of a tray, the spring 80 is returned rearwardly by its elasticity and no longer abuts the flap 22 even when the drawer is in advanced position.

The particular structure of the flaps 22 and their functioning may also be understood from FIGS. 9 and 10.

Each flap is pivotally mounted about a fixed pin located at its upper part so that simply the weight of the flaps tends to return them normally into closed position. The pin, designated by reference 86, is fixed in a block 88, preferably made of aluminum, forming a crosspiece between the various superposed flaps and constituting a portion of the wall separating the storage space and the microwave chamber of the cupboard.

Each flap laterally carries a lifting roller 90 (FIG. 10), adapted to cooperate with a lifting system 24 already mentioned with reference to FIG. 2.

This lifting system is constituted by a plate 92 extending vertically along the whole of a column of superposed flaps 22. the whole of the lifting system 24 is located laterally with respect to the opening 20 closed by the flap 22, so as not to hinder passage of the dishes to be reheated towards the microwave chamber 12.

This plate 92 comprises a series of notches 94 distributed over its length with the same pitch as the superposed trays. These notches 94 are arranged to be able to receive the rollers 90.

The plate 92 blocks the flaps 22 in closed position by their rollers 90 when the notches 94 are not opposite the rollers. When the plate 92 is lifted with a view to opening the flaps, the notches 94 arrive at a certain point opposite the rollers 90. At this moment, either the spring 80 abuts the flap 22 to try to open it and the roller 90 then penetrates into the corresponding notch 94, the continuing lift of the plate 92 then naturally taking along the flap 22 in its rise until the flap is completely opened, or the spring 80 does not abut on the flap 22 and said latter remains in closed position despite the lifting of the plate 92.

Consequently, each lifting system 24 lifts the flaps of the same column simultaneously, but to the exclusion of the flaps corresponding to the positions of trays for which either no tray is engaged on the corresponding drawer or the drawer is in rear position.

The flaps 22 are metal flaps of which the structure is particularly adapted to their function of insulation against the microwave radiation between the reheating chamber 12 and the tray storage space 10.

A problem is raised as the separation wall 18 is made of metal and the flaps 22 are themselves metallic. If it is not desired to make a very tight adjustment of the flaps 22 in the openings 20, which would present a drawback due to the metal against metal friction which would adversely affect the action of the spring 80, it is necessary to provide a slight clearance between the periphery of the flap 22 and the opening 20. Now, if this clearance is small, there is the risk of arcs apparing between the opposite metal surfaces, when microwaves are emitted in chamber 12. There are therefore contradictory imperatives to avoid both the friction due to the rubbing of metal against metal if the clearance is virtually zero, the appearance of arcs due to the microwaves if the clearance is small, and the absence of tightness with respect to the microwaves if the clearance is large.

To solve this problem, the flap 22 comprises on its periphery a system forming a wave trap over the whole of the part where it comes into contact with the edges of the opening 20 of the separation wall 18.

This wave trap is constituted by a cavity 96 surrounding the flap part 22 engaging in the opening 20, the cavity presenting a slot 98 opening towards the outside all around this part, and more specifically opening into the gap between the walls opposite the flap 22 and the opening 20 when the flap 22 is closed.

The cavity is a resonant cavity for the microwaves, and its dimensions are chosen as a function of the wave length used, so that there is effectively resonance. This resonance constitutes the essential property of the cavity, which enables it to function as a wave trap by recovering all the radiation which may infiltrate in the clearance left between the opening 20 and the flap 22 and preventing any passage of rays towards the storage space.

To make this flap forming a wave trap, a block of aluminum is provided, in which is machined a peripheral groove to the chosen dimensions. This groove is closed by a metal plate 100 for forming both the closed cavity 96 and the slot 98 which runs along this cavity.

Thus, mobile metal flaps are produced, having a very good tightness with respect to microwaves despite the considerable clearance which is left between the flap and the opening to facilitate the movement of the flap.

The functioning of the storage and heating cupboard according to the invention will now be described, the functioning of the mechanisms for transporting the dishes to be reheated from the tray towards the microwave chamber and back again being more particularly described with reference to FIGS. 11 to 19.

At the beginning, the storage cupboard is empty, the drawers for supporting superposed trays are all returned to rest position, i.e., front position, by their springs 50. The openings of the cold air circulation shafts are therefore all closed.

As the drawers do not carry trays, the springs 80 do not exert any pressure on the metallic flaps separating the microwave chamber and the storage space at the level of each tray.

These flaps 22 are, moreover, locked by plate 92 which maintains them in closed position.

The transfer pallets 26 are in rear position, i.e., completely inside the microwave chamber 12.

If the cold air chilling circuit is not yet in operation, it is switched on. The cold air is preferably produced by a unit with a ventilation system for producing suction in shafts 72 and delivery in shafts 70.

By-pass systems are provided in order not to interrupt the chilling circuit when all the orifices are obstructed at the level of the trays by the drawers in front position. A by-pass flap is preferably provided which closes progressively as a function of the uncovering of openings 74 and 76 at the level of the various trays, so that the flow of air remains constant at the level of the production unit.

The chilling circuit being switched on, the trays are introduced through the doors of the cupboard, i.e., they are slid one after the other on the individual drawers, the opening of the lateral compartment being directed towards the rear of the storage space.

The trays are introduced with their lids and it is recalled that a different lid being provided according to whether or not the main dish of the tray is a dish to be reheated. If the dish is not to be reheated, a lid is placed on the tray which prevents the complete engagement of the tray on the drawer.

In the general case of the dish having to be reheated, the tray is completely pushed on the drawer until its rear part engages in the notches provided at this end in the runners 16.

For trays which are engaged completely in the runners of the mobile drawers, it becomes possible to exert a rearward pull on the tray, taking the tray-drawer assembly over a distance of about 30 millimeters to a rear position where the drawer is hooked.

This results in disengaging the drawer which obstructed the openings in the cold air circulation shafts and in switching on a system for chilling the compartment of the trays which were therefore able to be pulled rearwardly.

It is provided that only dishes chilled at +3° C. (in addition to the possible cold products) are arranged in the same cupboard, for a given type of cupboard, or only frozen dishes at −18° C. (or possibly cold producls) for another type of cupboard.

In fact the refrigerator unit of a cupboard delivers only one type of cold air, either at about 0° C. (chilled distribution) or at −35° C. (quick-freeze distribution).

For the trays which cannot be engaged in the runners, the impossibility of pulling the tray rearwardly causes the cold air inlet openings to remain obstructed.

During this tray loading operation, the flaps 22 for insulating against microwaves are always locked by the ramps 92.

The cupboard may thus function possibly for several hours between the moment of preparation of the meals and the moment of distribution thereof, with a correct refrigeration for the main dishes contained in the lateral compartments of the trays.

A little before the distribution of the meals, a certain number of trays are selected, of which the main dishes will be reheated simultaneously.

To this end, all the drawers carrying the selected trays are replaced into front position, leaving the others in rear position, without investigating whether the tray replaced in front position carries a cold dish or a dish to be reheated since, as has already been explained, the flap communicating with the microwave chamber will open only for the trays which are completely engaged on their drawer.

During this procedure for placing the drawers of the selected trays in front position, a counting system may be provided for noting the number of selected trays in order subsequently to verify that all the selected plates have been withdrawn, to aviod reheating a dish of the same tray several successive times.

To this end, it may be provided that the lug of a tray of which the drawer is replaced in front position meets a stop controlling a counting shaft common to all the trays of a column, the rotation of this shaft provoking a pulse on electrical counting means.

A corresponding count-down will be effected when the dishes are withdrawn after the reheating sequence, to verify that all the selected trays are withdrawn.

At the end of forward stroke of the drawer carrying a selected tray, this drawer re-obstructs the cold air orifices. Its spring 80 is pushed against the flap 22 which remains provisionally locked by the plate 92 for lifting the flaps, which plate is for the moment in low position.

At the end of selection of the trays to be reheated, the doors of the storage space of the cupboard are closed and an automatic sequence for bringing to suitable temperature is controlled, which is effected in several stages, as follows:

(a) A motor for controlling the plate 92 lifting the flaps 22 acts on said plate to lift it. Those flaps which are subjected to the pressure of the springs 80 will pivot on their pin and will be lifted via roller 90, by engagement of the latter in the notches 94 of the plate 92. The flaps corresponding to the trays for which a dish is to be reheated will therefore all be lifted when the plate 92 reaches an elevated position.

(b) After the mobile flaps are lifted, the drive shafts 34 of the rods 32 controlling the displacement of the transfer pallets 26 are rotated The pallets are driven towards the compartments of the trays and penetrate inside the compartments for which the flaps 22 are lifted. As will be explained hereinafter, a disconnecting system is provided to prevent a complete drive of the pallets located opposite closed flaps.

The pallets 26 penetrate into the compartments beneath the dishes which are to be reheated and, in a return movement towards the microwave chamber, take these dishes into said chamber 12.

(c) Once all the dishes to be reheated are placed on the pallets inside the microwave chamber 12, the lifting plate 92 is lowered so as to return flaps 22 into closed position to assure tightness against the microwaves between the microwave chamber 12 and the tray storage space 10.

(d) The emission of microwaves is then initiated with a view to reheating all the dishes contained in the chamber 12. Of course, this latter is hermetically closed and its metal walls confine the microwaves inside the chamber, by reflexion.

Certain parts of the objects contained in chamber 12, and especially the pallets 26, are preferably constituted by a material permeable to microwaves in order not only that they are not subjected to heating by these waves, but also that they do not prevent the reheating of the dishes which are to be reheated.

For example, the pallets are made of the synthetic material which may be a complex of silicon stabilized with glass fibres.

The microwaves emitted are for example waves at 2450 Megahertz produced by magnetrons. A variable duration of microwave emission may preferably be provided, as a function of the number of trays selected in each reheating sequence. For example, this duration is automatically established by using the data delivered by the system for counting the selected trays, mentioned hereinabove.

(e) After the end of the microwave emission, the metal flaps 22 are again lifted automatically by the lifting system 24, in the same way as in stage (a).

The same flaps as before are lifted since the positions of drawers and of trays on the drawers have not varied and the springs 80 always act on the same flaps.

(f) The pallets 26 for transferring the reheated dishes are again displaced by the rods 32 fast with the common drive shafts 34, thereby to return the reheated dishes to inside the compartments of the trays 14.

(g) Flaps 22 is then relowered, but only down to an intermediate position where the flaps partially close the openings 20, sufficiently to prevent the dish returned into the compartment from leaving. The flaps are immobilised by plates 92.

(h) Movement of the transfer pallets 26 terminates with their return from inside the compartment to their rear position in the microwave chamber. The reheated dishes returned to the compartment remain therein, blocked by the flaps.

(i) System 24 for lifting the flaps is controlled again to return, the flaps to completely closed position, locked by the plates 92.

It may advantageously be provided that the operations from the lifting of the flaps with a view to reintroduction of the reheated dishes in the compartments of the trays, be controlled from a manual intervention for controlling unloading. It is then advantageous to provide that the products be maintained at suitable temperature by periodic microwave pulses between the end of the microwave emission for normal reheating and the manual intervention for controlling unloading.

(j) The doors of the tray storage space are unlocked if automatic locking is provided after the trays are loaded.

(k) The trays are unloaded manually with countdown, as explained hereinabove, to assure that all the heated trays have been unloaded.

It is advantageously provided that the counting shaft is then locked in the direction of counting, so that it is impossible to engage new trays as long as the selected trays have not been unloaded, i.e., as long as the counting system has not been returned to its initial value.

This operation constitutes the last stage of the reheating sequence and a new sequence may be effected for other trays which are possibly still stored in the cupboard.

FIGS. 11 to 19 show schematic views representing operations (a) to (i) of the reheating sequence.

In FIG. 11, the tray is shown in rear position, the spring 80 not abutting on the corresponding flap 22.

Flaps 22 are in any case locked by the locking ramp 92.

The transfer pallets 26 are placed in rear position inside the microwave chamber.

In FIG. 12, the drawer carrying the tray 14 is moved to advanced position when said tray is selected. The tray shown in FIG. 12 is a tray which carries a dish to be reheated, the tray being completely engaged on the drawer and the spring 80 pushed by the tray, via the stop 82, abuts on the flap 22.

FIG. 13 shows the operation of lifting of the flap by the plate 92, the roller 90 of the flap engaging in the corresponding notch 94 of the plate 92 when said latter rises.

When the flap 22 is conpletely lifted as shown in FIG. 14, the pallets 26 are driven towards the inside of the compartments of the trays and slide beneath the dishes to be reheated, contained in said compartments. The pallet is then returned towards its initial position, taking the dish with it into the microwave chamber 12.

FIG. 15 schematically shows the system with the dish to be reheated contained in the chamber 12 during microwave emission, i.e. after closure, due to plate 92, of the flaps 22 which were opened.

Figure 16:
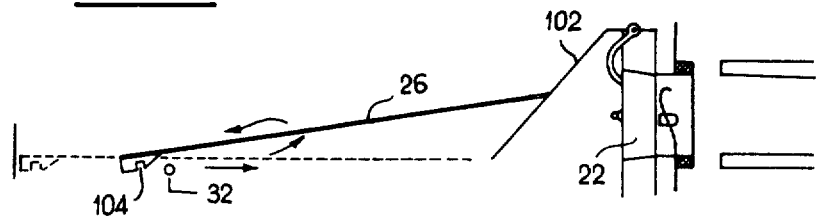
FIG. 16 shows the system for disconnecting the pallets located opposite closed metallic flaps.

FIG. 16 schematically indicates the means used for preventing the pallets from abutting against the flaps which remain closed (flaps of the non selected trays or flaps of the trays which carry cold products) while all the pallets 26 are driven simultaneously by a drive shaft 34 mentioned with reference to FIG. 2.

A disconnecting ramp 102 is provided for each flap 22 which ramp covers it over its whole width so that when the flap is closed the ramp 102 is interposed between the pallet 26 and the corresponding flap 22.

When the pallet is driven forwardly by its rod 32, its end meets the inclined disconnecting ramp 102 and is consequently lifted as seen in FIG. 16, this lift being continued until the rod 32, still driven, separates from the pallet 26 and continues its stroke. The disconnected pallet 26 slides downwardly along the ramp 102 until it returns to its initial position shown in dotted lines in FIG. 16.

When the rod 32 returns rearwardly during the return movement of the assembly of pallets towards the microwave chamber, the rod 32 hooks on the pallet 26, which returns the assembly to its initial state.

To render fastening and disconnecting of the rod 32 on and from pallet 26 possible, the connection between the rod and the pallet is simply a notch 104 provided at the lower part of the pallet, the rod leaving the notch when the pallet is lifted. As the pallet 26 is supported by runners, as has been explained with reference to FIG. 2, it naturally returns to the initial position and the rod 32 which moves in a fixed plane may reengage in the notch 104 on its return.

The disconnecting ramp 102 is mounted to pivot so as to be able to be lifted by the flap 22 when said latter is lifted by its lifting system. In fact, the principle of the ramp 102 means that it completely obstructs the passage between the pallet and the flap when said latter is closed, and it is therefore necessary for this ramp 102 to disappear when the flap is open.

As seen in FIGS. 13 and 14, the ramp 102 lifts at the same time as the flap. It is simply pushed by the latter and drops by its own weight at the same time as the flap.

Figure 17:
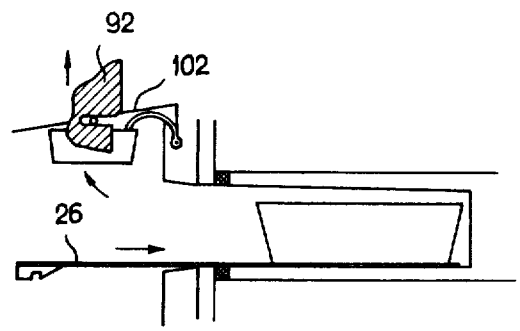
FIGS. 17 to 19 show the stages of reintroduction of a dish, once heated, at the end of a heating sequence.

FIG. 17 shows the return stage of the transfer pallet 26 to inside the compartment of the tray 14 to return the dish once heated. This operation obviously takes place only after the end of the microwave emission and after lifting of the flaps 22 which were closed during this emission.

Figure 18:
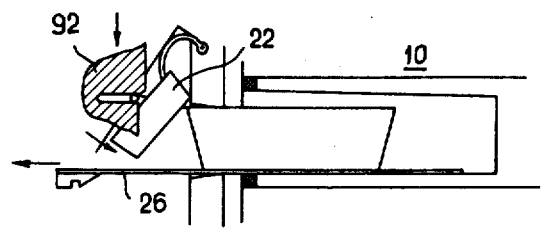

FIG. 18 shows the withdrawal of pallet 26 towards the microwave chamber 12 after partial reclosure only of flap 22 by the lifting plate 92. This reclosure is simply sufficient for the withdrawal of the pallet 26 without the reheated dish, which abuts against the partially closed flap.

Figure 19:
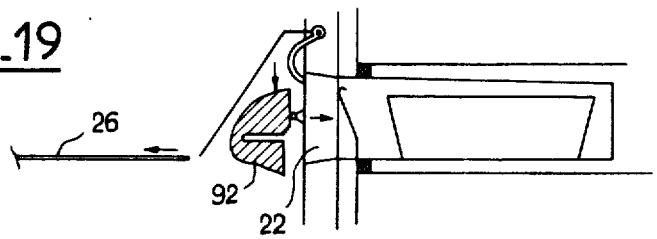

FIG. 19 shows the return into initial position, the pallet 26 having returned into the microwave chamber 12 and the flap 22 being again closed and locked by plate 92.

The corresponding tray may be unloaded from the storage cupboard, the reheating sequence being terminated.

What is claimed is:

1. In a cupboard for storing and bringing to suitable temperature prepared meals carried on superposed trays each comprising an inner compartment opening out on a side-wall of the tray, said cupboard comprising
   (a) a space for storing said trays;
   (b) a chamber for bringing the dishes contained in the inner compartments of said trays to suitable temperature;
   (c) individual metallic flaps comprising at least one movable portion provided at the level of each tray for selectively separating and placing said storage space and chamber in communication; and
   (d) transporting means for transferring the dishes contained in the inner compartments of the trays towards the chamber for bringing them to suitable temperature and for returning them into the compartments where they were located, after a sequence of bringing to suitable temperature effected in the chamber intended for this purpose.

2. The cupboard of claim 1, wherein said transporting means comprises a plurality of mobile pallets resting on runners and placed opposite the mobile flaps opening in front of the compartments of the trays, each pallet being able to move horizontally to inside the compartments and to slide beneath the dishes to be transported.

3. The cupboard of claim 2, comprising inclined ramps opposite the end of each pallet to raise this end, the inclined ramps being themselves liftable by the flaps when said latter are open, so that they can deflect the pallets if said latter move whilst the individual flaps are closed but not if the flaps are open.

4. The cupboard of claim 3, wherein each pallet is driven by a rotating rod cooperating with a notch in the pallet, the notch in the pallet unhooking from the rod when the pallet is lifted by an inclined ramp.

5. In a cupboard for storing and bringing to suitable temperature prepared meals carried on superposed trays each comprising an inner compartment opening out on a side wall of the tray, said cupboard comprising
   (a) a space for storing said trays;
   (b) a chamber for bringing the dishes contained in the inner compartments of said trays to suitable temperature, said space and chamber being separated by a separation wall provided with openings opposite each tray position;
   (c) individual metallic flaps comprising at least one movable portion provided at the level of each tray to obstruct said openings and thus selectively separate and place said space and said chamber in communication;
   (d) a spring placed in front of each movable portion of an individual flap and on which a said tray may abut to exert a resilient thrust force on the movable portion of said flap when a tray is pushed in, with a view to reheating the dish contained in its inner compartment by a source of heat in said chamber; and
   (e) means for lifting those flaps which are subjected to the action of said springs.

6. The cupboard of claim 5, wherein each movable flap portion has a roller thereon, said lifting system comprising a hooking plate extending vertically in front of a series of flaps, said hooking plate having notches therein for engaging the rollers of the individual flaps when they are pushed by said springs which are associated therewith, the hooking plate being liftable to assure the lifting of these flaps.

7. The cupboard of claim 1, further comprising a system of maintaining the dishes contained in the inner compartment of a said tray at low temperature, this system comprising cold air circulation shafts opening opposite each tray position, laterally with respect to said movable flaps, so as to cause air to circulate inside said inner compartment of a said tray.

8. The cupboard of claim 7, further comprising at the level of each tray a sealing system surrounding both the opening of the side compartment of the tray and the openings of said cold air circulation shafts, whereby the cold air is confined inside said side compartment but not in the whole of said storage space.

9. The cupboard of claim 7, wherein there is provided, in the storage space, for each tray position, a drawer with runners on which a said tray may be placed, said drawer being returned by a spring towards a forward position and being hookable in a rear position, said drawer further comprising a seal forming part which obstructs the openings of said cold air circulation shafts when said drawer is in its forward position, said openings being uncovered when said drawer is in its rear position.

10. The cupboard of claim 9, wherein said drawer comprises in its rear part a hooking system adapted to cooperate with a said tray which may fit in said drawer by this system, whereby said drawer may be moved to its rear position by manually pulling the tray thus engaged, against the means for returning said drawer.

11. The cupboard of claim 9, comprising a band forming seal at the front of said drawer, surrounding the location where the opening of the inner compartment of a said tray on such drawer is applied, to effect a cold air seal, preventing leakages via the edges of said tray when the drawer carrying said tray is placed in its rear position, the front of said tray being located in a fixed passage against which said seal is closely applied and in which are located the openings of said cold air circulation shafts at the level of said tray.

12. The cupboard of claim 9, wherein the spring pushing against the individual movable flap at each tray position is mounted on said drawer with runner so that said spring is pushed against the corresponding movable flap when a tray is in place on said drawer and said drawer is in its forward position, and it does not exert any thrust when the tray is not in place or when the drawer is in rear position.

13. The cupboard of claim 12, wherein said drawer comprises a system of engaging the tray in normal position, wherein a means is provided for preventing such engagement for certain trays placed on said drawer, and said spring does not abut on said movable flap when a tray is not engaged.

14. The cupboard of claim 5, wherein said chamber comprises a source of microwaves, wherein each metallic flap presents a peripheral cavity extending over the periphery of the flap portion obscuring the openings in the wall separating said storage space from said chamber, said cavity opening to the outside by a continuous slot over the whole of said periphery, and said cavity having dimensions in connection with the wave length of the microwave radiations of the source, so as to form a wave trap for radiation which attempts to pass through the interstices left between said storage space and said chamber at the level of the openings obstructed by said movable flaps.

15. In a cupboard for storing and bringing to suitable temperature prepared dishes carried on superposed trays each comprising an inner compartment opening out on a side wall of the said cupboard comprising a space for storing said trays and a chamber for bringing the dishes contained in the compartments of said trays to suitable temperature, said storage space comprising a chilling system with cold air circulation shafts having openings in said storage space at the level of each tray:
said storage space comprises a series of superposed drawers, each drawer adapted to carry a tray and comprising obstruction means thereon capable of selectively hermetically closing said openings of said cold air circulation shafts which are located at the level of such drawer, each drawer being normally returned by a spring into a position where this closure is effected by said obstruction means and being hookable in a position where said obstruction means uncover said openings.

16. The cupboard of claim 15, wherein said drawer comprises means for hooking a tray, these means being such that, if the tray is hooked on the drawer, said latter may be drawn by means of the tray to its hooked position where the obturation means uncover said openings.

17. The cupboard of claim 16, wherein said drawer comprises second sealing means, surrounding the opening of said inner compartment provided in said tray, in order to direct the air released through said openings of said shafts solely into said compartment and not into the rest of said storage space, when a tray is hooked on said drawer and when said latter is in position uncovering the openings of said shafts.

* * * * *